Nov. 16, 1926.  
E. H. PRATHER  
1,607,016  
TOURIST ROAD SIGN  
Filed Jan. 16, 1925
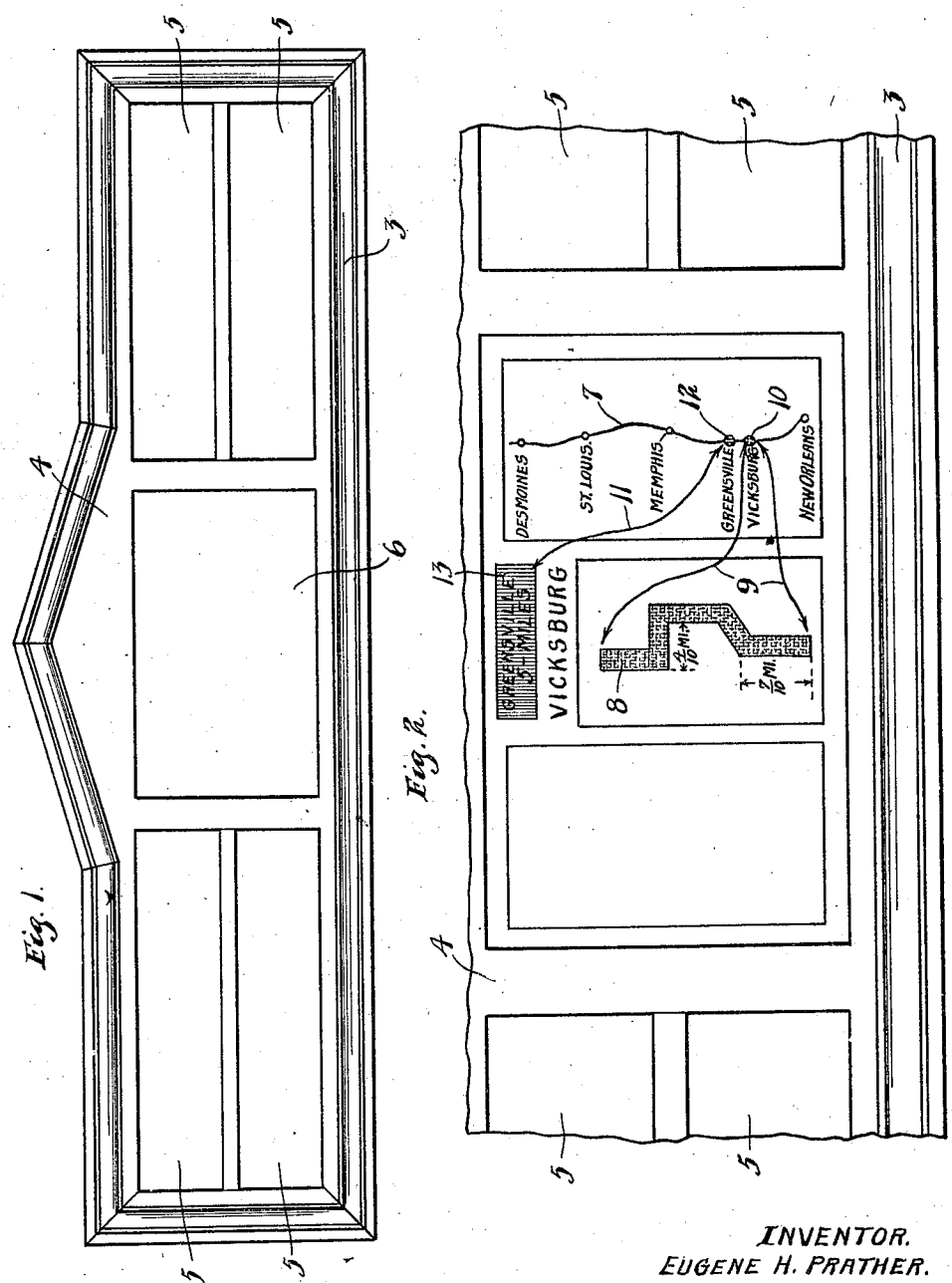
INVENTOR.  
EUGENE H. PRATHER.  
BY HIS ATTORNEY.

Patented Nov. 16, 1926.

1,607,016

UNITED STATES PATENT OFFICE.

EUGENE H. PRATHER, OF MINNEAPOLIS, MINNESOTA.

TOURIST ROAD SIGN.

Application filed January 16, 1925. Serial No. 2,822.

This invention relates to road signs adapted to give valuable information to tourists and also to display advertising.

It is the main object of the invention to provide a simple but highly efficient tourist road sign, which will not only give tourists the knowledge of their exact location on a certain trail or route but which will, moreover, provide them with a diagram of the immediately adjacent portion of the trail to be travelled.

More specifically it is an object to provide a road sign which will have an enlarged diagram of the road to be travelled for some distance from the location of the sign, thereby permitting the tourist to become acquainted with the correct course to follow and also to permit him to foresee bad curves or irregular portions of the trail.

It is a further object to provide indicating means extending from an enlarged diagram of a portion of a relatively long route to a diagram on a relatively small scale of the main portion of the route, thereby showing just which portion of said route the enlarged diagram represents.

It is still a further object of the invention to put dimensions on the enlarged diagram and to also supply indicating means on the sign for acquainting the tourist with the name and distance of the next town.

These and other objects will be apparent from the following description made in connection with the accompanying drawings wherein like characters refer to similar parts throughout the several views, and wherein Fig. 1 is a front elevation of the sign with the details omitted from the several panels; and Fig. 2 is an enlarged fragmentary front elevation of the central portion of the sign showing the diagrams on the central panel.

In the drawings, the frame of the sign is indicated by the numeral 3, in which the body or back portion 4 is mounted. The several panels 5 are adapted to contain display advertising. In the central panel designated by the numeral 6, a diagram 7 on a small scale of a comparatively long route or trail is mounted, having the names of the various towns printed thereon. A second diagram 8, on a comparatively large scale, is mounted in the panel 6 adjacent to diagram 7. One end of this enlarged diagram represents the point on the trail at which the sign is placed, while the diagram itself represents a small portion of the route or trail immediately adjacent to the location of the sign. Indicating devices or arrows 9 extend from the opposite ends of the diagram 8 to the opposite sides of a dot or other figure 10 on the diagram 7, which represents a particular portion of the general route enlarged and represented in the diagram 8. Another arrow or indicating device 11 extends from the dot or other figure 12, representing the next town on the general route to a small panel 13, on which the name of the town with the distance thereto from the end of the enlarged diagram 8 is printed.

On the enlarged diagram 8 the measurements of the various straight distances are indicated, thereby enabling the tourist to gain a good idea of his turns and course to follow for the next few miles.

From the above description, it will be readily seen that the tourist coming up to one of these novel signs, can readily see what portion of the trail he is on, what the nature of the preceding road is, and also the approximate distance from one point or town to the next town on the trail.

Preferably the dot 10 and the diagram 8 are colored in the same shade, as, for example, in yellow, as indicated on the drawings. The background of the panel 13 and the dot 12 are also preferably colored in the same shade, as illustrated in red in the drawings. This similarity in colors adds considerably in readily enabling the tourist to connect the enlarged diagram with the small portion on the general trail which it represents.

The sign is especially useful in giving the tourist a knowledge of just how to get through and out of a town about to be entered, as well as to indicate bad curves or dangerous cross-roads about to be encountered; also giving the tourist the distances to the various turns or curves to be encountered. For example, a tourist coming to the sign illustrated on the drawing will readily see that he is just coming into the town of Vicksburg and will have plotted out before him the course of the trail going through that town, with the distances of the various towns marked out. He will thus be able to readily find his way through and out of Vicksburg. At the same time he may see that the next town after Vicksburg is Greensville, which is five miles therefrom, and, if he desires, may ascertain what towns are next in line.

It is obvious that the invention may be equally applied to indicate dangerous stretches of roads, bad turns and dangerous cross-roads, which the tourist is approaching. The co-operation of the two diagrams, with the indicating devices therebetween, point out simply, but clearly, the desirable information above described.

It is thus seen that a simple and highly efficient tourist road sign has been provided, which will be of great value to tourists and will, at the same time, be a means for displaying advertising on the roads before the entrance to the various towns.

It will, of course, be understood that various changes may be made in the form, details and arrangement of parts without departing from the scope of the invention.

What is claimed is:

1. In a tourist road sign, a diagram thereon of a comparatively long route on which said sign is placed, and an adjacent diagram thereon on a comparatively large scale of a small portion of said route, and indicating lines extending from the ends of said second diagram to the ends of the portion of said first diagram which said second diagram represents.

2. In a tourist road sign, a diagram thereon of a comparatively longe route on which said sign is placed, a mark on said diagram in a certain color indicating a locality of said route, an adjacent diagram indicating a portion of said route extending through said locality on a comparatively large scale and in the same color as said mark, and indicating means extending between said mark and said last mentioned diagram.

3. In a tourist road sign, a diagram thereon of a comparatively long route on which said sign is adapted to be placed, marks on said diagram indicating localities on said route, an adjacent diagram on a comparatively large scale of the portion of said route extending through one of said localities, characters prominently displayed indicating the name and distance of another locality on said route, and an indicating line between said characters of the mark on said first mentioned diagram indicative of said locality.

In testimony whereof I affix hereto my signature.

EUGENE H. PRATHER.